(12) United States Patent
Cheng et al.

(10) Patent No.: US 10,782,560 B2
(45) Date of Patent: Sep. 22, 2020

(54) ELECTRONIC DEVICE AND DISPLAY DEVICE

(71) Applicant: InnoLux Corporation, Miao-Li County (TW)

(72) Inventors: Pai-Chiao Cheng, Miao-Li (TW); Tsung-Han Tsai, Miao-Li (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/052,649

(22) Filed: Aug. 2, 2018

(65) Prior Publication Data
US 2019/0064590 A1 Feb. 28, 2019

(30) Foreign Application Priority Data

Aug. 30, 2017 (CN) .......................... 2017 1 0764545

(51) Int. Cl.
*G02F 1/13357* (2006.01)
*F21V 8/00* (2006.01)

(52) U.S. Cl.
CPC ..... *G02F 1/133603* (2013.01); *G02B 6/0086* (2013.01); *G02F 1/133606* (2013.01); *G02F 1/133615* (2013.01); *G02B 6/0003* (2013.01); *G02B 6/0023* (2013.01); *G02F 2001/133614* (2013.01)

(58) Field of Classification Search
CPC ......... G02F 1/133603; G02F 1/133606; G02F 1/133615; G02B 6/0086
See application file for complete search history.

(56) References Cited

U.S. PATENT DOCUMENTS

| 6,637,905 | B1* | 10/2003 | Ng | G02B 6/0026 |
| | | | | 362/601 |
| 2007/0236627 | A1* | 10/2007 | Ha | G02B 5/0221 |
| | | | | 349/64 |
| 2009/0109366 | A1 | 4/2009 | Lippey | |
| 2011/0002140 | A1* | 1/2011 | Tsukahara | B32B 27/286 |
| | | | | 362/602 |
| 2016/0091758 | A1* | 3/2016 | Yoneyama | G02F 1/133603 |
| | | | | 349/69 |
| 2018/0059310 | A1 | 3/2018 | Bae | |

OTHER PUBLICATIONS

Andrew R. Hanson, "Good Practice for the Measurement of Gloss", 2006, NPL, Measurement Good Practice Guide No. 94, (Year: 2006).*

* cited by examiner

*Primary Examiner* — Isiaka O Akanbi
*Assistant Examiner* — Nathaniel J Lee
(74) *Attorney, Agent, or Firm* — Winston Hsu (57) ABSTRACT

An electronic device includes a light source and a light converting element. The light converting element is disposed adjacent to the light source and has a first surface adjacent to the light source and a second surface corresponding to the first surface and positioned farther from the light source. The first surface has a first gloss which is less than a second gloss of the second surface. A display device includes a display panel and a backlight module disposed corresponding to the display panel. The backlight module includes a light source and a light converting element disposed adjacent to the light source. The light converting element has a first surface adjacent to the light source and a second surface corresponding to the first surface and positioned farther from the light source. The first surface has a first gloss which is less than a second gloss of the second surface.

8 Claims, 9 Drawing Sheets

ELECTRONIC DEVICE AND DISPLAY DEVICE

BACKGROUND OF THE DISCLOSURE

1. Field of the Disclosure

The present disclosure relates to an electronic device and a display device, and more particularly to an electronic device having light converting element and a display device having light converting element.

2. Description of the Prior Art

In recent years, it is a design tendency to keep on thinning the structures of liquid crystal display (LCD) device and electronic product that has LCD panel disposed therein, such as mobile phone, tablet, wearable device and so on. Therefore, light emitting diodes (LED) are adopted to serve as light generators and replace conventional cold cathode fluorescent lamp (CCFL) in most backlight modules for providing backlight source, such that the volume of the backlight modules may be decreased. Most of the flat displays require white light source as backlight source. However, current white light emitting diodes still have issues remain unsolved, such as low color purity, complex structure, and high manufacturing cost. Therefore, one of current methods provides the way of using blue light emitting diode to generate blue light and further to excite photoluminescent material, so as to produce white light through light-mixing. The conversion efficiency of photoluminescent material directly affects the light conversion efficiency of the backlight module. Therefore, it is still an issue for the manufacturer in related fields to enhance the conversion efficiency by innovative design.

SUMMARY OF THE DISCLOSURE

One of the objectives of the present disclosure is to provide an electronic device and a display device, wherein the conversion efficiency of the light converting element may be increased through modifying the surface gloss of the light converting element, so as to improve the light conversion efficiency of the electronic device and/or the light conversion efficiency of the backlight module in the display device.

An embodiment of the present disclosure provides an electronic device. The electronic device includes a light source and a light converting element. The light converting element is disposed adjacent to the light source, wherein the light converting element has a first surface and a second surface corresponding to the first surface, the first surface is positioned adjacent to the light source, and the second surface is positioned farther from the light source. The first surface has a first gloss, the second surface has a second gloss, and the first gloss is less than the second gloss.

Another embodiment of the present disclosure provides a display device. The display device includes a display panel and a backlight module. The backlight module is disposed correspondingly to the display panel. The backlight module includes a light source and a light converting element. The light converting element is disposed adjacent to the light source, and the light converting element has a first surface and a second surface corresponding to the first surface. The first surface is positioned adjacent to the light source, and the second surface is positioned farther from the light source. The first surface has a first gloss, the second surface has a second gloss, and the first gloss is less than the second gloss.

These and other objectives of the present disclosure will no doubt become obvious to those of ordinary skill in the art after reading the following detailed description of the embodiment that is illustrated in the various figures and drawings.

DETAILED DESCRIPTION

For purposes of being easily understood by people of ordinary skills in related fields, by reference to the following several embodiments, taken in conjunction with the drawings as described below, the content and the function to be reached in the present disclosure are described in detail. These embodiments do not intend to limit the present disclosure. Besides, it is understood that when the terms "include", "comprise" and/or "have" are used in the description of the present disclosure, the corresponding features, areas, steps, operations and/or components would be pointed to existence, but not limited to the existence or addition of one or a plurality of other features, areas, steps, operations and/or components. It will be understood that when a component such as a layer or an area is referred to as being "disposed on" or "extended above" another component (or the variant thereof), it can be directly disposed on or directly extended above the other component, or intervening components may be presented. In contrast, when a component is referred to as being "directly on" or "directly extended above" another component (or the variant thereof), there are no intervening components presented. It will also be understood that when a component is referred to as being "coupled to" another component (or the variant thereof), it can be directly connected to another component or indirectly connected to (such as electrically connected to) another component through one or more than one components.

Figure 1:
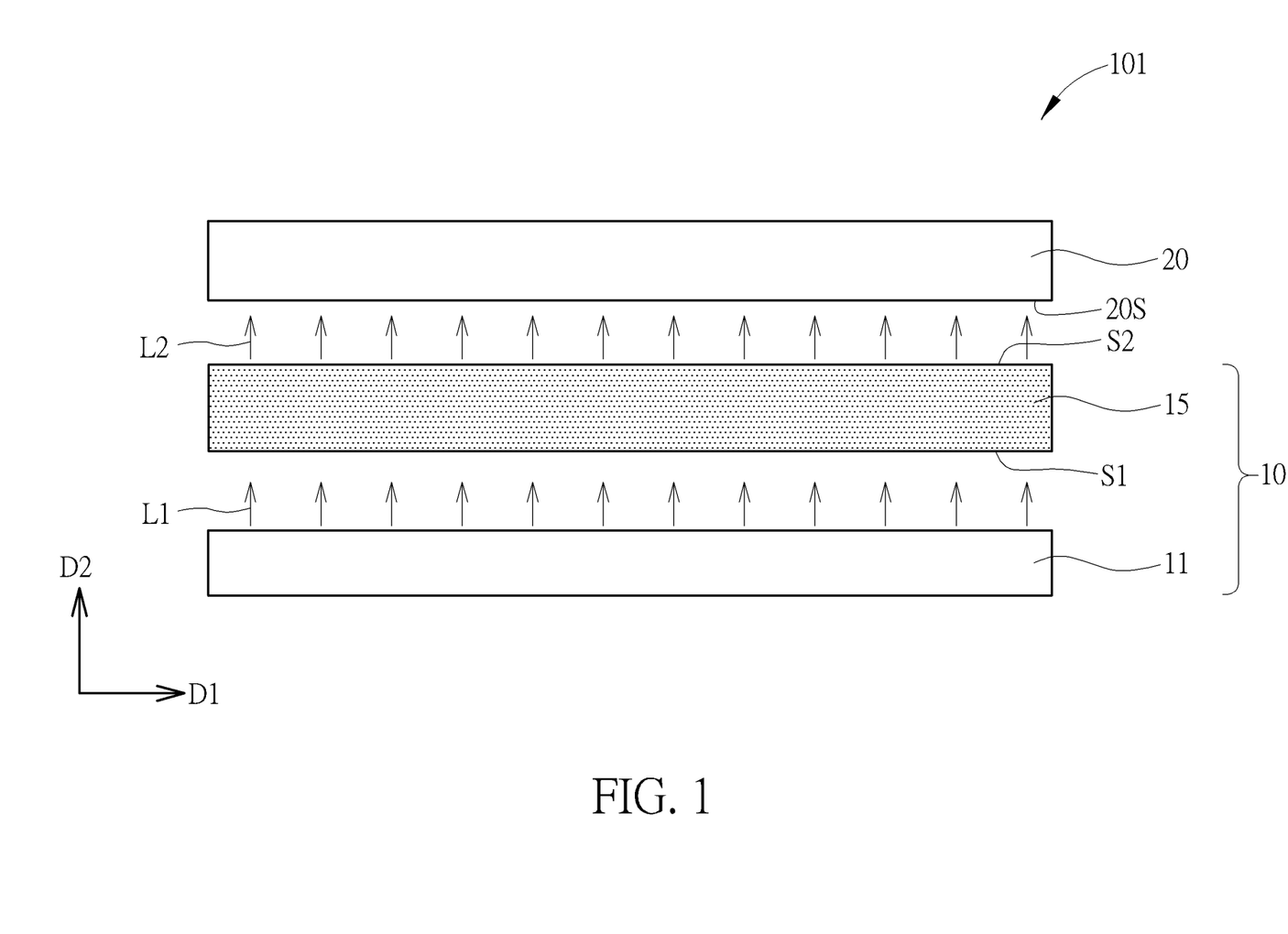
FIG. 1 is a schematic diagram illustrating a display device according to a first embodiment of the present disclosure.

Referring to FIG. 1, FIG. 1 is a schematic diagram illustrating a display device according to a first embodiment of the present disclosure. As shown in FIG. 1, a display device 101 is provided in this embodiment. The display device 101 includes a display panel 20 and a backlight module 10. The display panel 20 and the backlight module 10 are correspondingly disposed. In some embodiments, the backlight module 10 may be disposed adjacent to a lower surface 20S of the display panel 20 for providing light toward the display panel 20. The display panel 20 may include liquid crystal display panel, electro-wetting display panel or other suitable non-self-luminous display panels. In some embodiments, display panel 101 may be a flexible display device, a touch display device or a curved display device, but not limited thereto. The backlight module 10 may include alight source 11 and a light converting element 15, wherein the light converting element 15 is disposed adjacent to the light source 11. In some embodiments, the light source 11 may include light emitting diode (LED), micro light-emitting diode (micro LED), quantum dot (QD) material, fluorescence material, phosphor material, any other suitable light source or any combination thereof, but not limited thereto. Besides, one or more optical films (not illustrated) such as diffusion film, brightness enhancement film and/or polarizer, maybe disposed between the backlight module 10 and the display panel 20 as needed, but not limited thereto. The type of the light converting element 15 may include a film layer having light converting material, a flexible thin film having light converting material or a light converting element formed with light converting material packaged in a container. The light converting element 15 may include a structure with single layer or with a stack of multiple layers, but not limited thereto. The above mentioned light converting material may include quantum dot material, fluorescence material, phosphor material, any other suitable photoluminescent material or any combination thereof, but not limited thereto. The light converting element 15 has a first surface S1 and a second surface S2 corresponding to the first surface S1. The first surface S1 is positioned adjacent to the light source 11, and the second surface S2 is positioned farther from the light source 11 than the first surface S1. The first surface S1 has a first gloss, the second surface S2 has a second gloss, and the first gloss is less than the second gloss. Gloss is a physical quantity (or value) obtained by measuring the surface property of a material according to the condition of international standard. The unit of gloss may be gloss unit (GU). The measurement of gloss may be performed according to international standards such as ISO 2813, ISO 7668, ASTM D523, ASTM D2457, DIN 67530, JIS 28741, etc. The measurement should conform to at least one of the above international standards. For example, when measuring, a gloss meter is calibrated by using a standard specimen first, wherein the gloss unit of the standard specimen (n=1.567) is defined as 100 GU. Thereafter, the calibrated gloss meter is used to measure a specimen, and the gloss of the specimen can be obtained after the gloss meter compares the specimen with the standard specimen and converses the comparison value. In one embodiment, the standard specimen is a highly polished black glass (such as barium crown glass, BaK50) with a smooth top surface, the n value of the black glass measured by sodium D line (wavelength: 589.3 nm) is 1.567, and the result of gloss measurement of the black glass is defined as 100 GU.

The first surface S1 of the light converting element 15 may be considered as a light incident surface of the light converting element 15, and the second surface S2 of the light converting element 15 may be considered as a light emitting surface of the light converting element 15, but not limited thereto. After the light emitted by the light source 11 (such as the first light L1 illustrated in FIG. 1) enters the light converting element 15 through the first surface S1, it may react with the light converting material(s) in the light converting element 15 (such as inducing excitation, being filtered or being enhanced) and then a second light L2 that is different from the first light L1 may be emitted from the second surface S2 of the light converting element 15, so as to provide light converting function. For example, the first light L1 may be blue light, and the light converting material in the light converting element 15 may convert at least a portion of the blue light into light with other color (s) (such as red light and green light), and another portion of the first light L1 may penetrate through the light converting element 15 and mix with light with other color(s) produced through converting by the light converting element 15 to form a second light that has mixed color (such as white light), but not limited thereto. In some embodiments, the second light L2 may be obtained by modifying the color of the first light L1 and/or the light converting material in the light converting element 15 depending on the required light conversion efficiency of the backlight module. In one embodiment, the light converting element 15 includes a light converting material that can convert the color of an excited light into another color. In other embodiments, the light converting element may include a light converting material that can convert the color of an excited light into multiple colors by selecting the content ratios and the varieties of the associated light converting materials as needed, but not limited thereto. The property of the first surface S1 of the light converting element 15 facing the light source 11 will affect the light path of the first light L1 in the light converting element 15 after it enters the light converting element 15. When the first gloss of the first surface S1 decreases, the condition of entering the light converting element 15 through the first surface S1 of the first light L1 (such as light incident path or light incident uniformity) will be improved. In another aspect, when the second gloss of the second surface S2 increases, a portion of the first light L1 that has entered the light converting element 15 but not been converted by the light converting material may be reflected back into the light converting element 15 again, which may increase the light converting probability by the light converting material. Therefore, when the first gloss of the first surface S1 is relatively low and the second gloss of the second surface S2 is relatively high, the light converting element 15 may have higher conversion efficiency. As a result, the first gloss must be less than the second gloss. However, when the second gloss of the second surface S2 is too high, the reflection probability may be too high such that the total amount of light emitting will be decreased. Accordingly, the first gloss of the first surface S1 and the second gloss of the second surface S2 must be designed in a better range in coordination.

Figure 2:
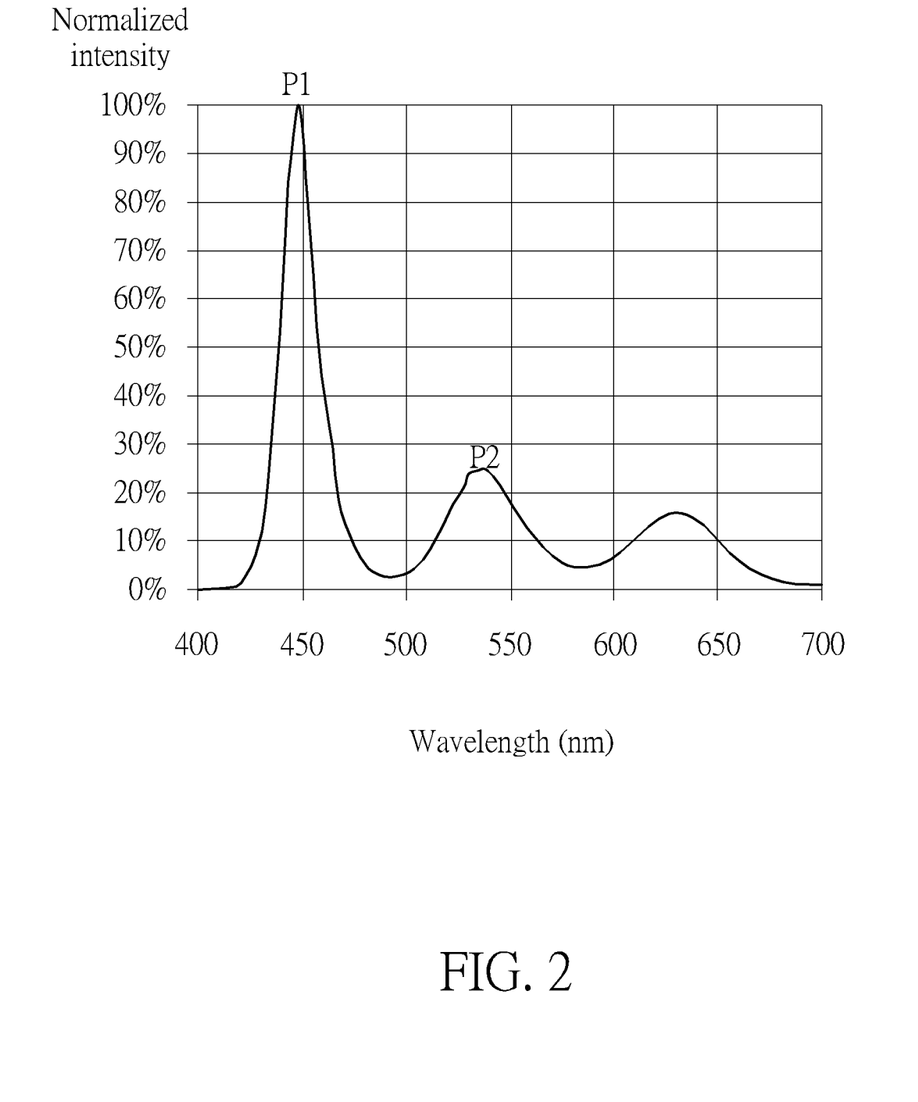
FIG. 2 is a schematic diagram illustrating a wavelength distribution of the output light of the backlight module according to the first embodiment of the present disclosure.
Figure 3:
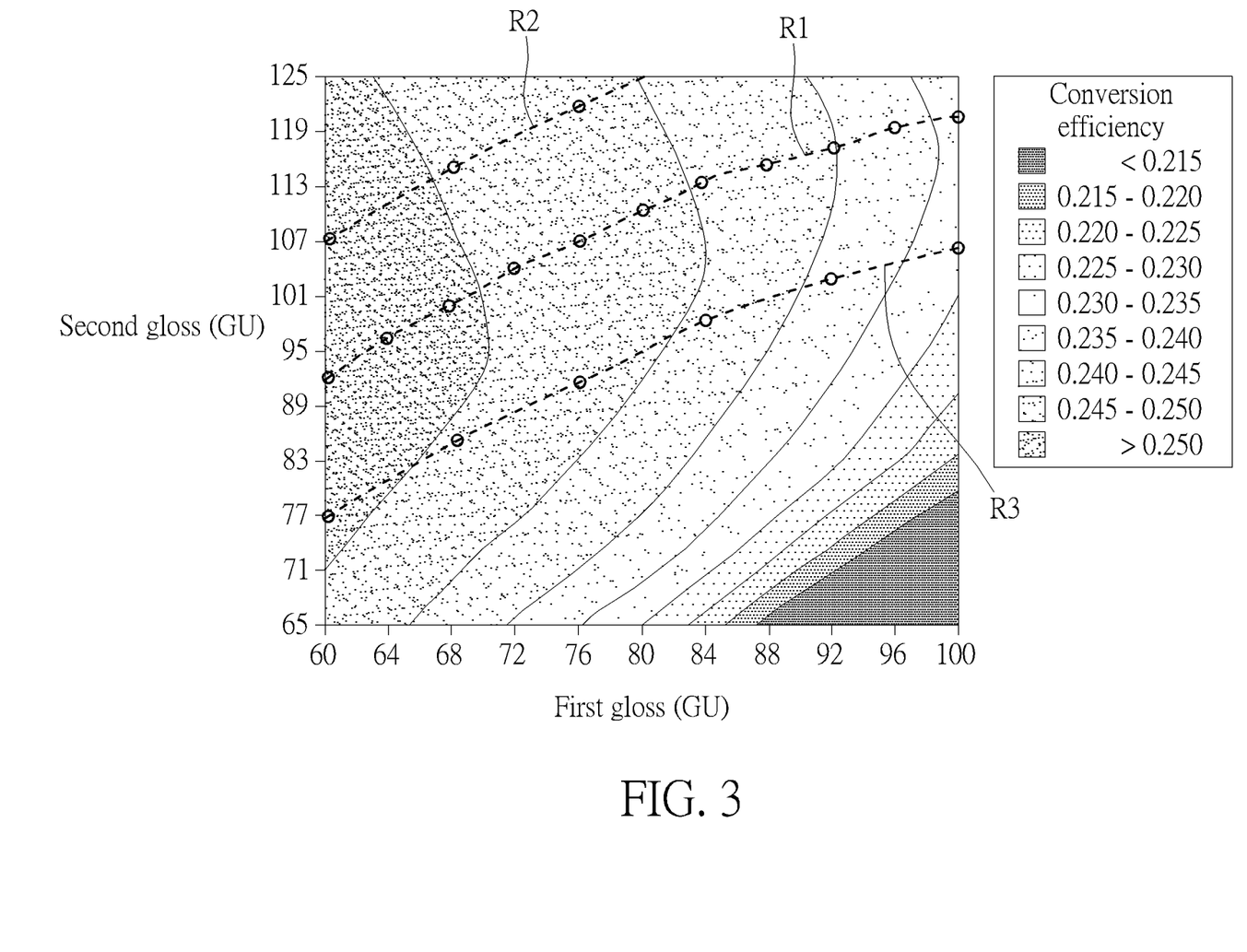
FIG. 3 is a schematic diagram illustrating a conversion efficiency corresponding to the first gloss and the second gloss according to the first embodiment of the present disclosure.

Referring to FIG. 1 to FIG. 3, FIG. 2 is a schematic diagram illustrating a wavelength distribution of the output light of the backlight module 10 according to the first embodiment of the present disclosure, and FIG. 3 is a schematic diagram illustrating a conversion efficiency corresponding to the first gloss and the second gloss according to the first embodiment of the present disclosure. The wavelength distribution of the second light L2 is shown in FIG. 2, wherein a first peak P1 corresponds to blue light and a second peak P2 corresponds to green light, and a conversion efficiency R may be defined as a ratio of the intensity of green light to the light intensity of blue light in the second light L2 (for example, $R=I_G/I_B$, wherein $I_G$ represents the intensity of green light and $I_B$ represents the intensity of blue light). In other words, when the first light L1 is blue light, and the light converting material in the light converting element 15 can convert at least a portion of the blue light into red light or green light, and the conversion performance of the light converting element 15 may be evaluated by the above mentioned conversion efficiency R. It should be noted that the wavelength distribution shown in FIG. 2 is the measurement result of the second light L2 emitted by the backlight module 10, which passes through the light converting element 15 in the backlight module 10, and the second light L2 does not pass through the display panel 20 yet. Besides, FIG. 3 illustrates the performance of conversion efficiency R of different first gloss associated with different second gloss. In one embodiment, the distribution in FIG. 3 may substantially comply with following regression equation:

$$R = a_0 + a_1 \times B + a_2 \times T + a_3 \times T^2 + a_4 \times \frac{T}{B},$$

wherein $a_0$=0.29939, $a_1$=−0.0025454, $a_2$=0.0041898, $a_3$=−0.00001273, $a_4$=−0.11051, B represents the value of the first gloss (unit: GU), and T represents the value of the second gloss (unit: GU). By partially differentiating the above regression equation with respect to the variable T, the relation between the maximum conversion efficiency R and the second gloss T and the first gloss B may be derived, as shown in following expression (I):

$$0 = \frac{\partial R}{\partial t} = a_2 + 2 \times a_3 \times T + a_4 \times \frac{1}{B},$$

which may be rearranged to obtain:

$$T = \frac{-1}{2 \times a_3} \times \left(a_2 + a_4 \times \frac{1}{B}\right).$$

Therefore, the second gloss T may be considered as a function related to the first gloss B. Next, by substituting the value of $a_2$, $a_3$ and $a_4$ into the expression and considering the processing variation (such as about +15 GU), the following expression (II) is derived:

$$149.6 - \frac{4340.5}{B} \leq T \leq 179.6 - \frac{4340.5}{B},$$

wherein the first relation line R1 shown in FIG. 3 may correspond to the expression (I), and the region between the second relation line R2 and the third relation line R3 shown in FIG. 3 may correspond to the expression (II). In other words, a combination of first gloss B and second gloss T that has better conversion efficiency may be obtained by carrying out a calculation based on expression (II). That is, if the value of the first gloss B is determined, a range of the second gloss T may be obtained by a calculation according to expression (II). Besides, in consideration of expression (II) and the variety of fabrication process, the first gloss B may be greater than or equal to 35 GU and less than or equal to 130 GU, and the second gloss T may be greater than or equal to 40 GU and less than or equal to 135 GU, but not limited thereto. By modifying the material composition included in the light converting element 15 or the condition of the designed first surface S1 and the second surface S2, the first gloss B and the second gloss T can meet expression (II), such that the light converting element 15 may have better conversion efficiency, and the light conversion efficiency of the backlight module 10 may be improved.

Different variant embodiments or embodiments of the present disclosure are described in the following description. To simplify the description, the following description will detail the dissimilarities among different variant embodiments or embodiments, and the identical features will not be redundantly described. Besides, the identical components in each of the following variant embodiments or embodiments are marked with identical symbols for making it easier to compare the difference between different variant embodiments or embodiments.

Figure 4:
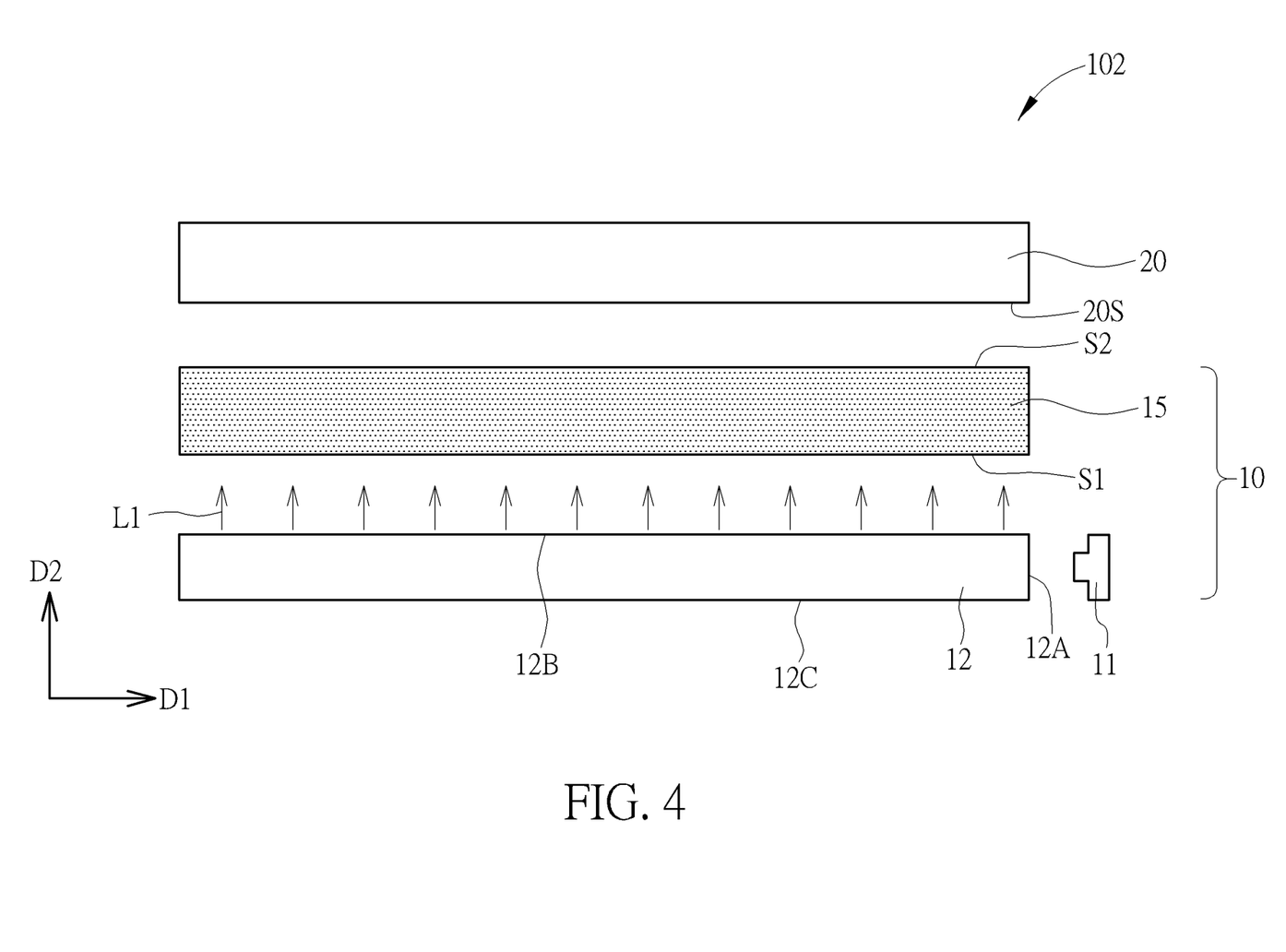
FIG. 4 is a schematic diagram illustrating a display device according to a second embodiment of the present disclosure.

Referring to FIG. 4, FIG. 4 is a schematic diagram illustrating a display device 102 according to a second embodiment of the present disclosure. As shown in FIG. 4, this embodiment is different from the above-mentioned first embodiment in that the backlight module 10 may further include a light guide plate 12 disposed adjacent to the light source 11, wherein the light source 11 may be disposed near a lateral surface 12A of the light guide plate 12, and at least a portion of the light converting element 15 is disposed between the light guide plate 12 and the display panel 20. In other words, the direction of the normal line of a top surface 12B (light emitting surface) of the light guide plate 12 may be defined as a second direction D2, a first direction D1 is perpendicular to the second direction D2, the light source 11 may be disposed near at least a lateral surface of the light guide plate 12 in the first direction D1, the light converting element 15 may be disposed on the top surface 12B of the light guide plate 12 that faces the display panel 20 in the second direction D2, and the second direction D2 may be considered as the thickness direction of the light guide plate 12, but not limited thereto. Therefore, the backlight module in this present disclosure may be considered as a side-edge type backlight module. Besides, the light guide plate 12 may include glass material, polymer material such as acrylic (Poly(methyl 2-methylpropenoate), PMMA), other light guide plate formed by materials that can withstand high temperature generated by the light source 11, or other material suitable for forming light guide plate, but not limited thereto. The light guide plate 12 may have a regular, irregular, and/or asymmetric shape, but not limited thereto.

Figure 5:
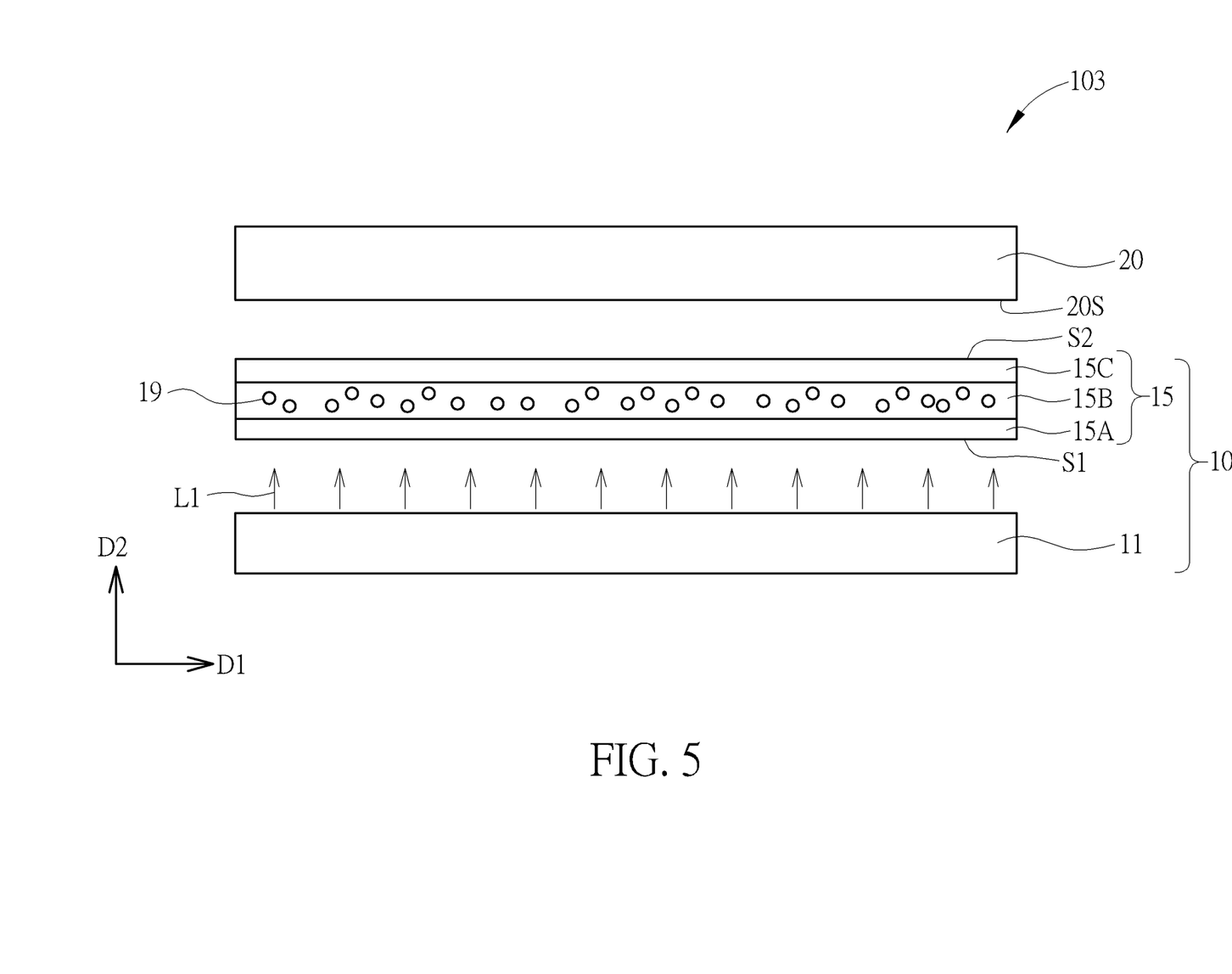
FIG. 5 is a schematic diagram illustrating a display device according to a third embodiment of the present disclosure.

Referring to FIG. 5, FIG. 5 is a schematic diagram illustrating a display device 103 according to a third embodiment of the present disclosure. As shown in FIG. 5, this embodiment is different from the above-mentioned first embodiment in that the light converting element 15 may include a first layer 15A, a second layer 15B, and a third layer 15C. The second layer 15B may be disposed between the first layer 15A and the third layer 15C in the second direction D2, and the second layer 15B may include a light converting material 19 disposed therein. In some embodiments, the light converting material 19 may include quantum dot material, fluorescence material, phosphor material, other suitable photoluminescent material or a combination thereof, but not limited thereto. Besides, the first layer 15A or the third layer 15C may include a protection layer for protecting the second layer 15B that has the light converting material 19, but not limited thereto. In some embodiments, the first layer 15A, the second layer 15B and the third layer 15C may be formed by same material, or the material of the second layer 15B may be different from the first layer 15A or the third layer 15C, but not limited thereto. In other embodiments, the material of the second layer 15B may have similar refractive index to the first layer 15A or the third layer 15C, or the refractive index of the material of the second layer 15B may be greater than the refractive index of the material of the third layer 15C, but not limited thereto. For example, in consideration of the protective performance of the first layer 15A or the third layer 15C, a material that provides stronger protection effect such as polymer material may be used to form the first layer 15A or the third layer 15C, and the material that is easier to be uniformly doped with light converting material 19 such as resin material may be used to form the second layer 15B, but not limited thereto. Besides, the first gloss of the first surface S1 and the second gloss of the second surface S2 may also be controlled by modifying the associated selection of materials of the first layer 15A and the third layer 15C, the forming condition of the films, and/or the surface condition.

Figure 6:
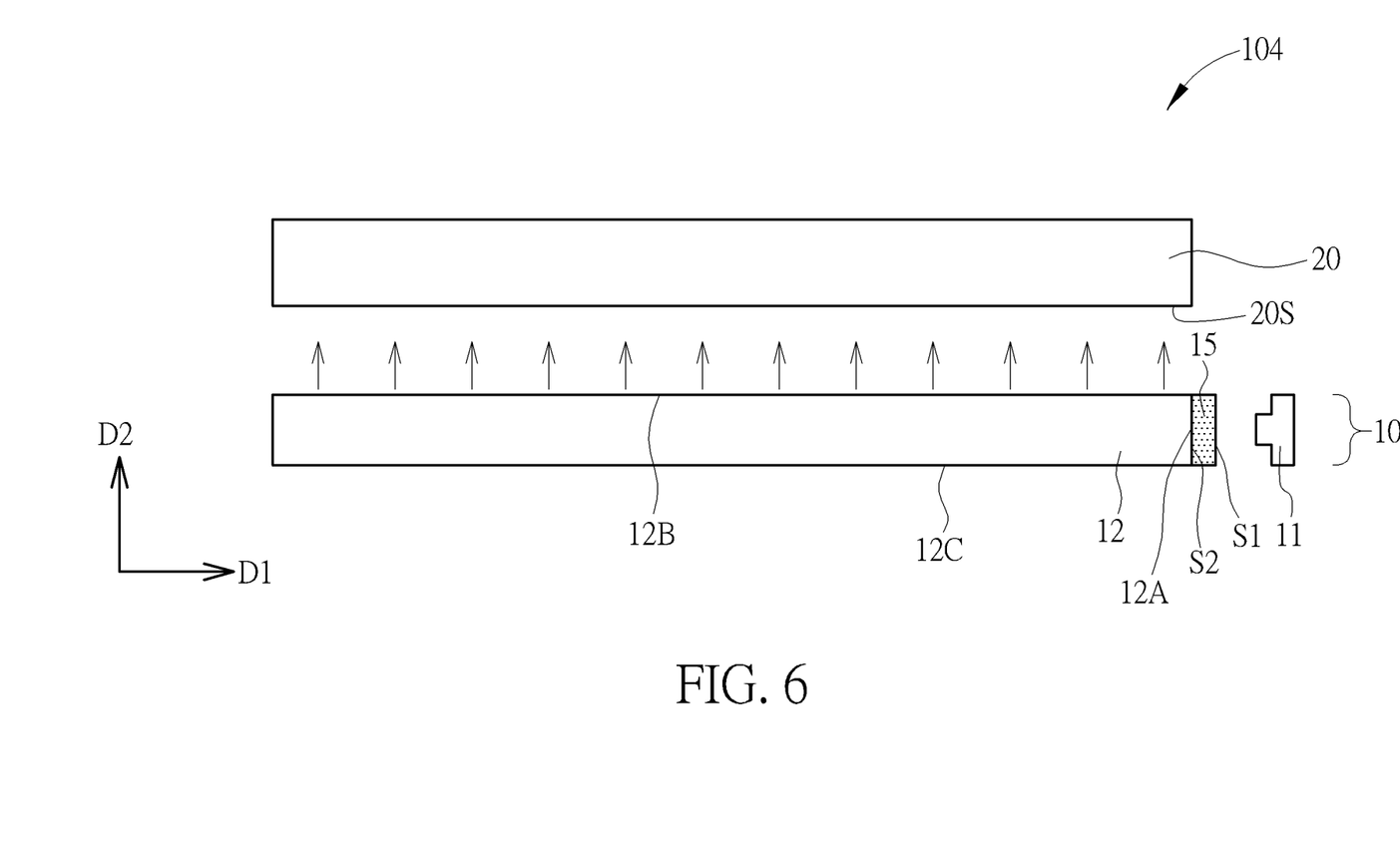
FIG. 6 is a schematic diagram illustrating a display device according to a fourth embodiment of the present disclosure.
Figure 7:
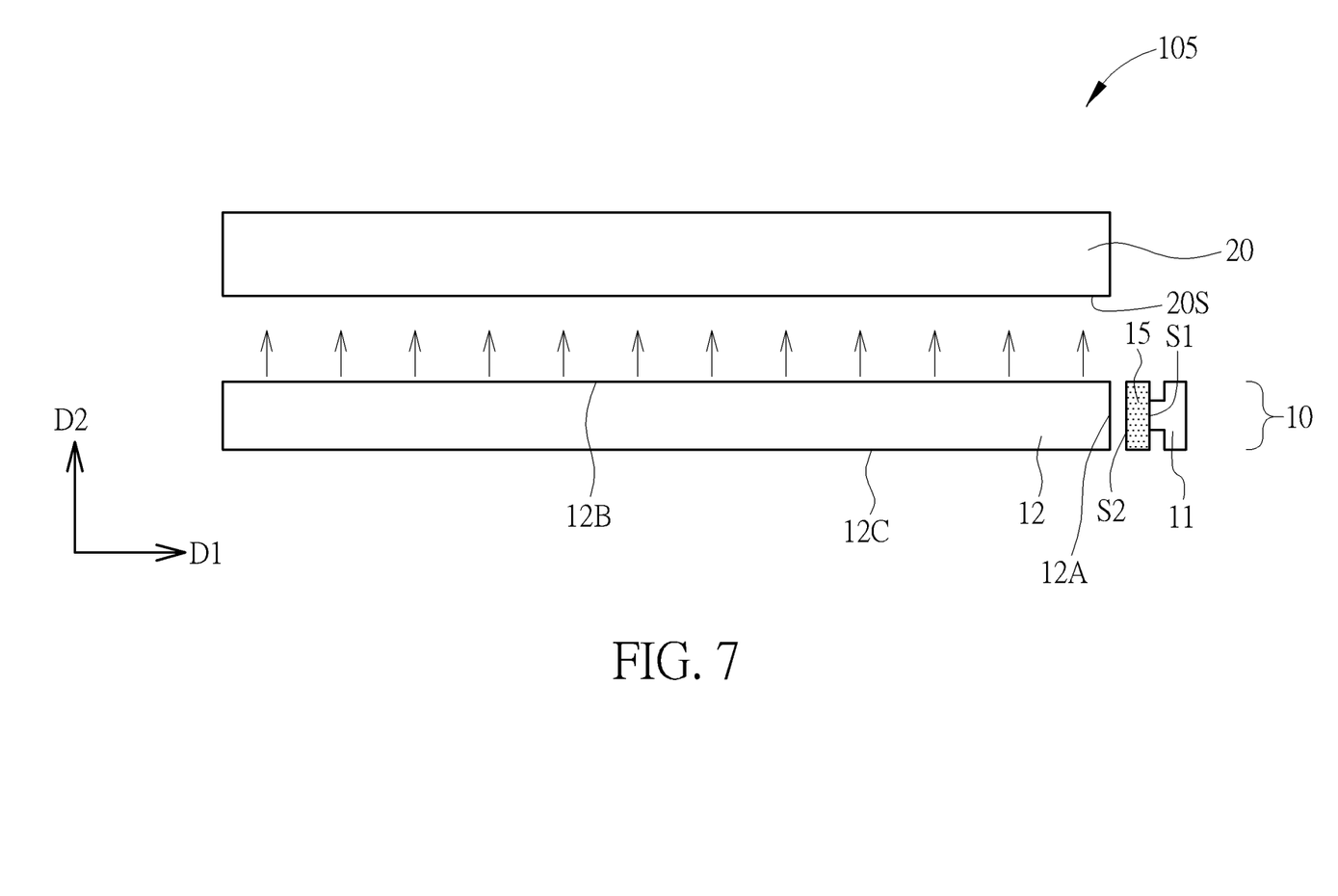
FIG. 7 is a schematic diagram illustrating a display device according to a fifth embodiment of the present disclosure.

Referring to FIG. 6 and FIG. 7, FIG. 6 is a schematic diagram illustrating a display device 104 according to a fourth embodiment of the present disclosure, and FIG. 7 is a schematic diagram illustrating a display device 105 according to a fifth embodiment of the present disclosure. As shown in FIG. 6 and FIG. 7, different from the above-mentioned second embodiment, the light converting element 15 may be disposed at the lateral surface 12A of the light guide plate 12 and may be disposed between the light guide plate 12 and the light source 11 in the first direction D1 in some embodiments. As shown in FIG. 6, in some embodiments, the light converting element 15 may be fixed on the light guide plate 12 as needed, wherein the second surface S2 of the light converting element 15 may be directly in contact with the lateral surface 12A of the light guide plate 12, but not limited thereto. In other embodiments, the second surface S2 of the light converting element 15 may be fixed near the lateral surface 12A of the light guide plate 12 through other adhesive layer or other element. As shown in FIG. 7, the light converting element 15 may be fixed on the light source 11 and the first surface S1 of the light converting element 15 may be directly in contact with the light source 11 in some embodiments, but not limited thereto. In other embodiments, the first surface S1 of the light converting element 15 may be fixed on the light source 11 through other adhesive layer or other element. It is noted that, in some embodiments, the light converting element 15 may be a film-type element and at least a portion of the light converting element 15 may be disposed on at least a portion of the lateral surface 12A, at least a portion of the top surface 12B and/or at least a portion of the lower surface 12C of the light guide plate 12.

Figure 8:
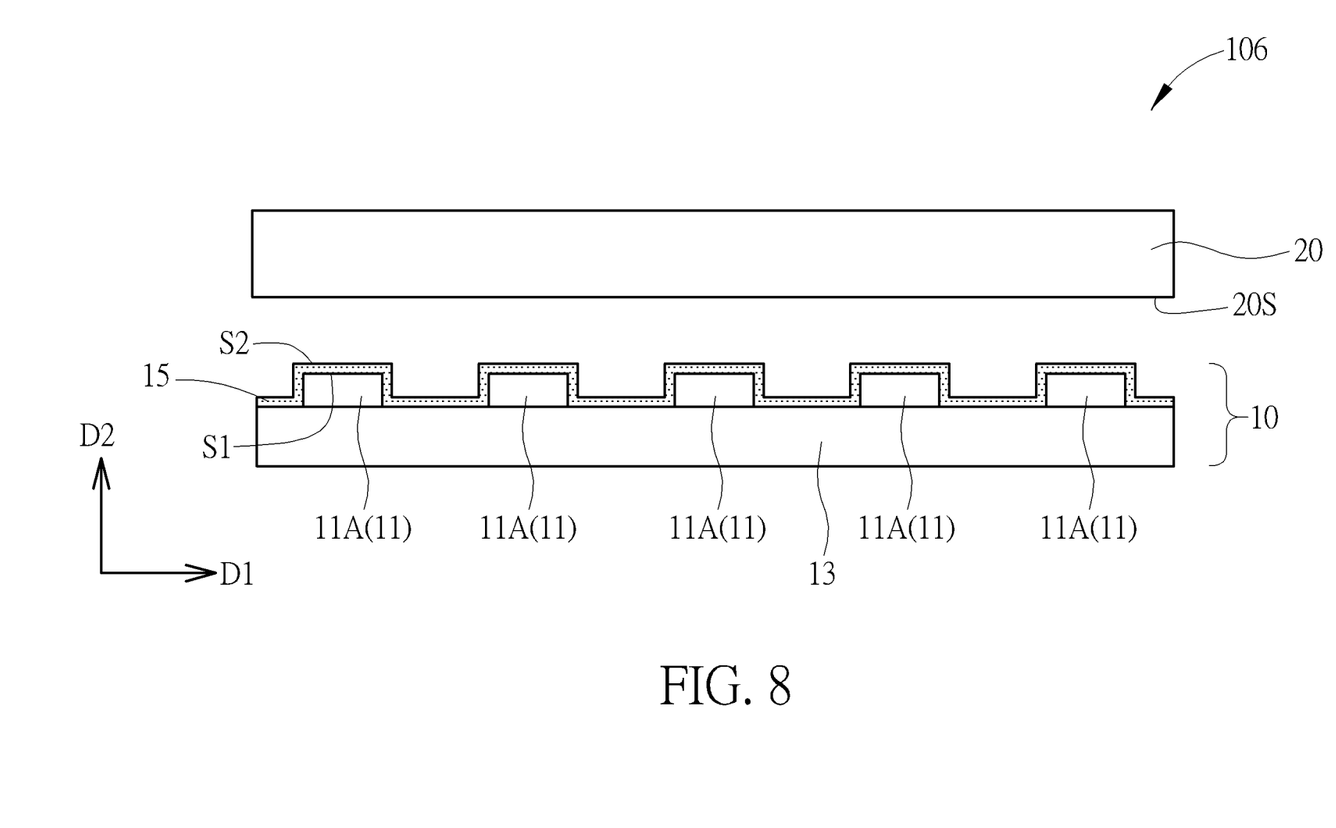
FIG. 8 is a schematic diagram illustrating a display device according to a sixth embodiment of the present disclosure.

Referring to FIG. 8, FIG. 8 is a schematic diagram illustrating a display device 106 according to a sixth embodiment of the present disclosure. As shown in FIG. 8, this embodiment is different from the above-mentioned first embodiment in that the backlight module 10 may further include a substrate 13 disposed corresponding to the display panel 20, wherein the light source 11 is disposed on the substrate 13, and at least a portion of the light converting element 15 may be disposed between the display panel 20 and the light source 11. In one embodiment, the light converting element 15 may be a film-type element or a flexible-substrate element that covers the light source 11. For example, the light source 11 may include a plurality of light emitting elements 11A disposed on the substrate 13, and at least a portion of the light converting element 15 may cover at least one of the plurality of light emitting elements 11A. In some embodiments, the substrate 13 may include a structure of a single layer or multiple layers with reflective property, but not limited thereto. The substrate 13 may be a glass substrate, a printed circuit board, a flexible printed circuit board, a flexible substrate, a metal substrate, a back panel, or any other element that can carry the light source 11 thereon, but not limited thereto. The light emitting element 11A may include, for example, a light emitting diode, a micro light emitting diode, quantum dot material, fluorescence material, phosphor material, other suitable light source or a combination thereof, but not limited thereto.

Figure 9:
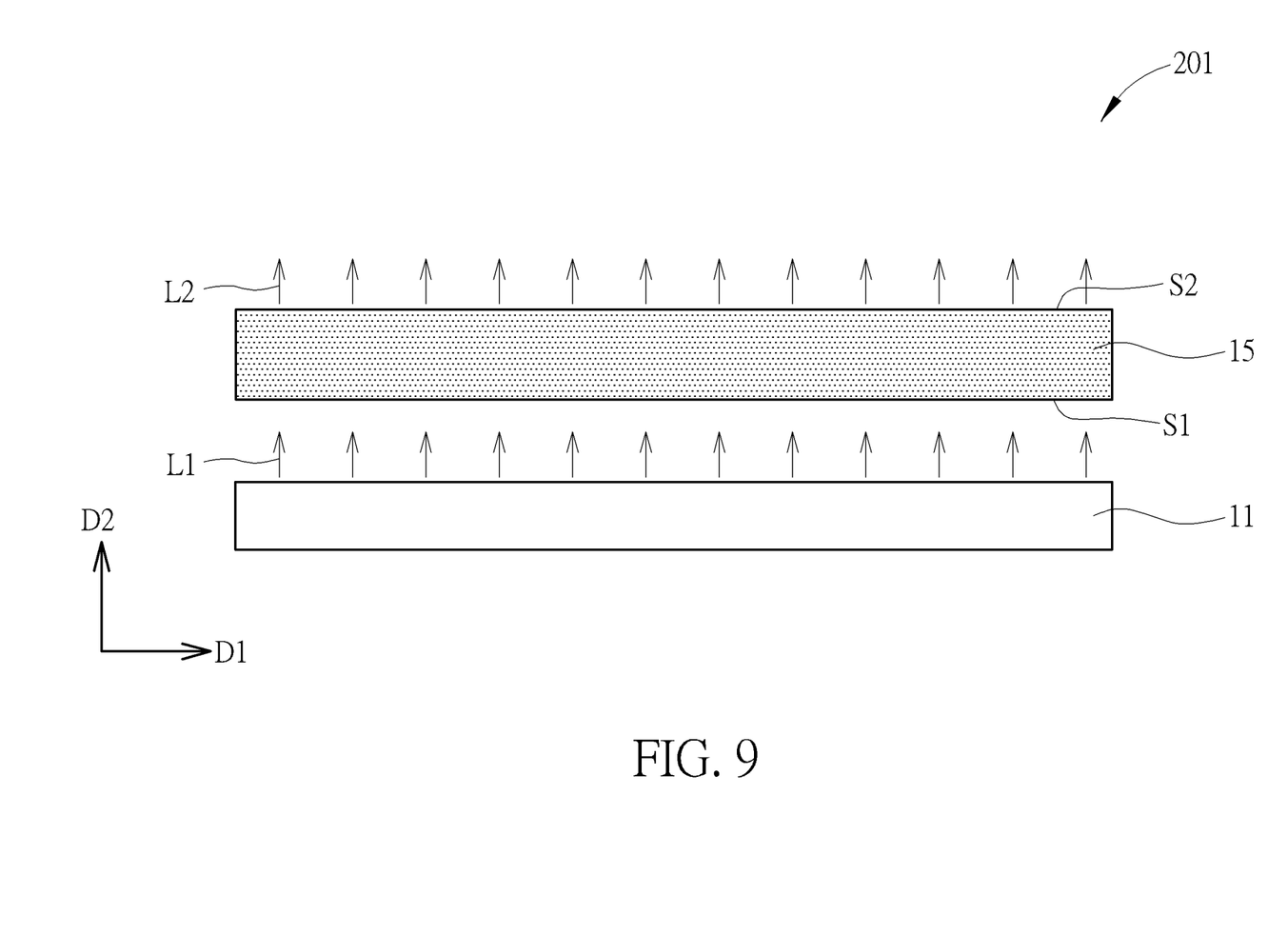
FIG. 9 is a schematic diagram illustrating an electronic device according to a seventh embodiment of the present disclosure.

Referring to FIG. 9, FIG. 9 is a schematic diagram illustrating an electronic device 201 according to a seventh embodiment of the present disclosure. As shown in FIG. 9, the electronic device 201 may include a light source 11 and a light converting element 15, wherein the light converting element 15 is disposed adjacent to the light source 11. The light converting element 15 has a first surface S1 and a second surface S2 corresponding to the first surface S1, wherein the first surface S1 is positioned adjacent to the light source 11, and the second surface S2 is positioned farther from the light source 11 than the first surface S1. The first surface S1 has a first gloss, the second surface S2 has a second gloss, and the first gloss is less than the second gloss. As mentioned in the above embodiments, the first gloss and the second gloss may comply with following expression (II):

$$149.6 - \frac{4340.5}{B} \leq T \leq 179.6 - \frac{4340.5}{B},$$

wherein B represents the value of the first gloss, T represents the value of the second gloss, and the unit of the first gloss and the second gloss is gloss unit (GU). In some embodiments, the first gloss may be greater than or equal to 35 GU and less than or equal to 130 GU, and the second gloss may be greater than or equal to 40 GU and less than or equal to 135 GU, but not limited thereto. The relative technical features of the light source 11 and the light converting element 15 have been described in the above embodiments, and will not be described redundantly herein. It should be noted that the backlight modules 10 mentioned in the above first embodiment to sixth embodiment may all be considered as the electronic device of the present disclosure. For example, as shown in FIG. 5, in some embodiments, the light converting element 15 of the electronic device may include the first layer 15A, the second layer 15B and the third layer 15C, wherein the second layer 15B may be disposed between the first layer 15A and the third layer 15C in the second direction D2, and the second layer 15B may include the light converting material 19. However, the electronic device of the present disclosure is not limited to serve as the backlight module of the display device. The electronic device of the present disclosure may be applied to other applications for light-emitting purposes.

In summary, by modifying the glosses of the surfaces of the light converting element, the first gloss of the first surface of the light converting element that is positioned adjacent to the light source may be less than the second gloss of the second surface of the light converting element that is positioned farther from the light source in the electronic device and the display device of the present disclosure. Lower first gloss may improve the light incident path or light incident uniformity when light enters the light converting element. Higher second gloss may have light that has entered the light converting element but not been converted by the light converting material be reflected back into the light converting element again, such that the probability for the light being converted by the light converting material is increased. Therefore, when the first gloss is less than the second gloss, the conversion efficiency of the light converting element may be increased, and thus the light conversion efficiency of the electronic device and the backlight module are improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
a display panel;
a backlight module disposed correspondingly to the display panel, the backlight module comprising:
a light source; and
a light converting element disposed adjacent to the light source, wherein the light converting element has a first surface and a second surface corresponding to the first surface, the first surface is positioned adjacent to the light source, and the second surface is positioned farther from the light source, wherein the first surface has a first gloss, the second surface has a second gloss, and the first gloss is less than the second gloss, wherein the first gloss and the second gloss comply with following expression:

$$149.6 - \frac{4340.5}{B} \leq T \leq 179.6 - \frac{4340.5}{B}$$

wherein B represents a value of the first gloss, T represents a value of the second gloss, a unit of the first gloss and the second gloss is gloss unit (GU), and the first gloss is greater than or equal to 35 gloss units and less than or equal to 130 gloss units; and
a light guide plate disposed adjacent to the light source, wherein the light source is disposed at a lateral surface of the light guide plate, and at least a portion of the light converting element is disposed between the light guide plate and the display panel.

2. The display device of claim 1, wherein the second gloss is greater than or equal to 40 gloss units and less than or equal to 135 gloss units.

3. The display device of claim 1, wherein the light converting element comprises a first layer, a second layer and a third layer, the second layer is disposed between the first layer and the third layer, and the second layer comprises a light converting material.

4. The display device of claim 3, wherein the light converting material includes a quantum dot material.

5. The display device of claim 3, wherein the light converting material includes a fluorescence material.

6. An electronic device, comprising:
a light source;
a light converting element disposed adjacent to the light source, wherein the light converting element has a first surface and a second surface corresponding to the first surface, the first surface is positioned adjacent to the light source, and the second surface is positioned farther from the light source, wherein the first surface has a first gloss, the second surface has a second gloss, and the first gloss is less than the second gloss, wherein the first gloss and the second gloss comply with following expression:

$$149.6 - \frac{4340.5}{B} \leq T \leq 179.6 - \frac{4340.5}{B}$$

wherein B represents a value of the first gloss, T represents a value of the second gloss, a unit of the first gloss and the second gloss is gloss unit (GU), and the first gloss is greater than or equal to 35 gloss units and less than or equal to 130 gloss units; and
a light guide plate disposed adjacent to the light source, wherein the light source is disposed at a lateral surface of the light guide plate, and at least a portion of the light converting element is disposed on the light guide plate.

7. The electronic device of claim 6, wherein the second gloss is greater than or equal to 40 gloss units and smaller than or equal to 135 gloss units.

8. The electronic device of claim 6, wherein the light converting element comprises a first layer, a second layer and a third layer, the second layer is disposed between the first layer and the third layer, and the second layer comprises a light converting material.

* * * * *